Dec. 14, 1943.                A. O. WILLIAMS                    2,336,661
                                RAILCAR TRUCK
                             Filed Jan. 7, 1942              3 Sheets-Sheet 1
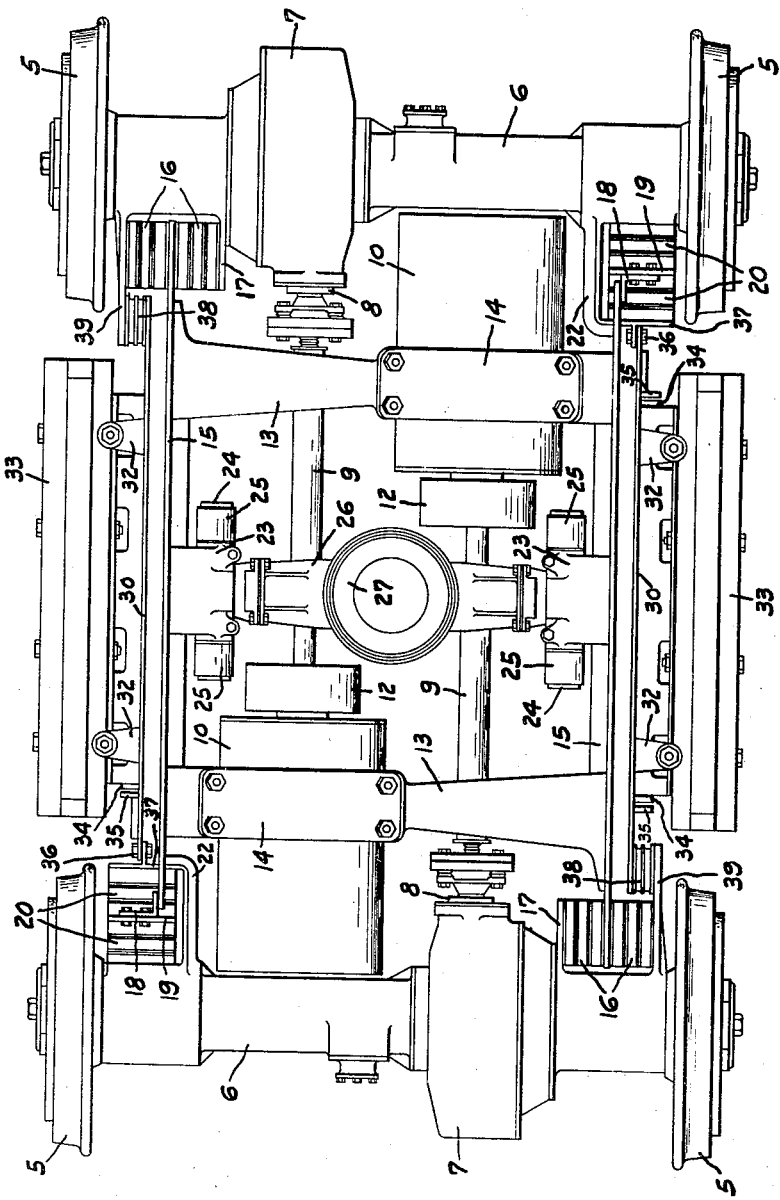
INVENTOR.
ALFRED O. WILLIAMS.
BY Walter E. Schirmer
                    ATTY.

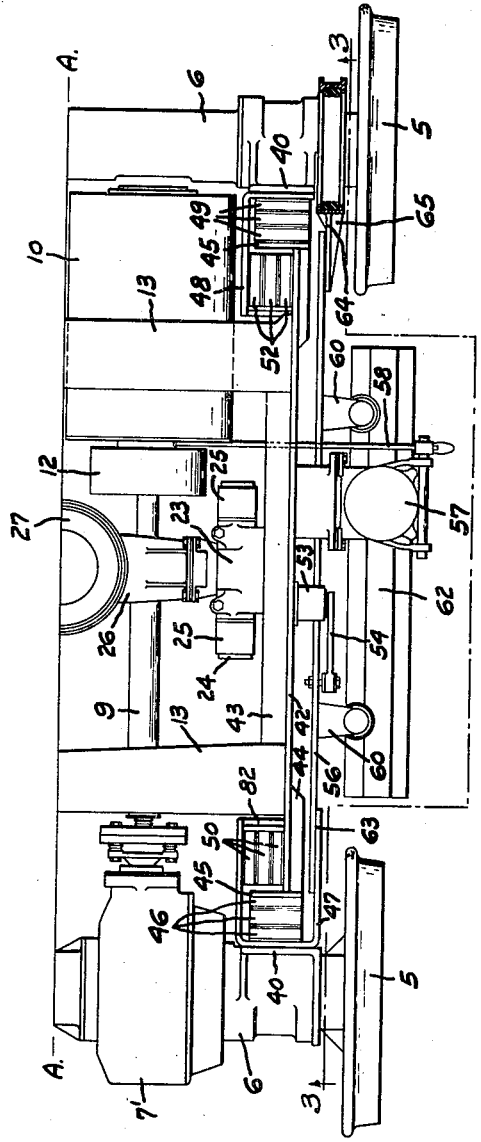

Dec. 14, 1943.  A. O. WILLIAMS  2,336,661
RAILCAR TRUCK
Filed Jan. 7, 1942  3 Sheets-Sheet 3
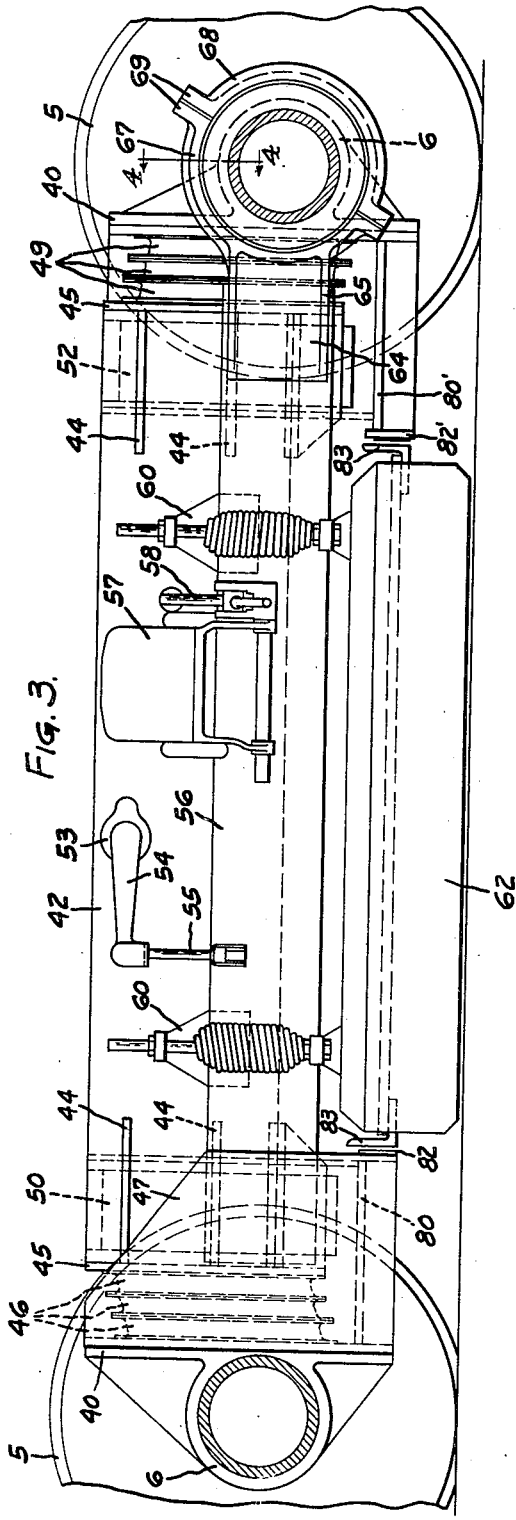
INVENTOR.
ALFRED O. WILLIAMS.
BY Walter E. Schirmer
ATT'Y.

Patented Dec. 14, 1943

2,336,661

UNITED STATES PATENT OFFICE 2,336,661

RAIL-CAR TRUCK

Alfred O. Williams, Battle Creek, Mich., assignor to Clark Equipment Company, Buchanan, Mich., a corporation of Michigan Application January 7, 1942, Serial No. 425,849

14 Claims. (Cl. 105—182)

This invention relates to railcar trucks, and more particularly is directed to rail trucks such as are used in streetcars, elevated and subway trains.

Trucks of this general type have heretofore been developed in which electric motors are carried in the truck and drive through bevel gearing to the truck axles. However, trucks of this general type with which I am familiar have been relatively expensive and have required the use of material which is difficult to fabricate, and requires a number of machining operations. For example, in one form of such truck, tubular side frame members are employed which are provided with posts coacting with cast metal spring pots carried on opposite sides of the axle adjacent each end thereof, and which receive conical rubber springs for resiliently supporting the frame members on the axles. Such a construction is expensive and complicated, and it has been found that such springs are not entirely satisfactory.

The present invention contemplates, as one of its primary objects, the provision of a truck in which the frame members are for the most part made of metal plate which can be readily fabricated and easily and quickly assembled.

Another object of the present invention is to provide a truck construction of this type in which the frame is articulated to a degree necessary to take care of track irregularities so that the axles have somewhat independent movement in a vertical plane without imparting such movement or the reactions thereof to the opposite axles.

Still another object of the present invention is to provide a spring construction comprising resilient rubber sandwiches of generally rectangular shape which may be arranged to take both lateral and longitudinal reactions and which may be easily assembled in position, and also are substantially more simple in construction and more economical in cost than the conical springs heretofore employed.

These and other advantages of the present invention will appear more fully from the following detailed description, which, taken in conjunction with the accompanying drawings, will disclose to those skilled in the art the particular construction and operation of a preferred form of the present invention.

In the drawings:

Figure 1 is a top plan view of one form of truck embodying the present invention;

Figure 2 is a top plan view of a portion of a truck embodying another form of the present invention;

Figure 3 is a side elevational view partly in section of the truck structure shown in Figure 2; and Figure 4 is a detailed sectional view taken substantially on line 4—4 of Figure 3.

Referring now in detail to Figure 1, the rail truck shown in this embodiment of the invention comprises the car wheels 5 which may be formed in a manner similar to that disclosed in the patent to Robert J. Burrows et al., No. 2,167,633, of August 1, 1939, or may be any other type of resilient cushioned wheel. These wheels are pressed onto axle shafts which extend through axle housings indicated generally at 6. The axle housings 6 are formed with gear housing portions 7 receiving a bevel gear, which may be of the hypoid type and which is adapted to be driven by a pinion extending into the nose portion 8 of the gear housings and driven from the shafts 9.

The shafts 9 at their opposite ends are connected in any suitable manner to the shafts of electric motors 10, which motor shafts are provided with the brakes 12 for the purpose of braking the speed of the vehicle when desired. The construction of the motor shaft brakes may be similar to that shown in my copending application, Serial No. 311,282, filed December 28, 1939. The motors are supported in position by means of transversely extending cross members 13 having arcuate cap members 14 for clamping the motor rigidly in position. Such a construction is shown in my Patent #2,167,064, issued July 25, 1939.

The opposite ends of the transverse members 13 are supported on the longitudinally extending side plates 15. These plates are of substantial vertical extent, and one end thereof is adapted to extend between the parallel sets of rubber sandwiches 16 carried in a suitable channel portion 17 formed in the housing 6 adjacent the gear case 7. The rubber sandwich members 16 comprise rectangular rubber segments to which are bonded thin metal plates, and the sandwiches preferably are arranged with each segment disposed in vertically offset relation to the next adjacent segment to form a more or less pyramidical structure. It will thus be seen that the weight imposed upon the side members 15 is transferred to the axle housings 6 through shear stresses in the rubber segments 16. At their opposite ends the side plates 15 have secured thereto the angle members 18, which in turn carry transversely extending plates 19. The plates 19 are secured in the center of transversely extending rubber segments 20 corresponding to the rubber segments 16 but disposed at right angles thereto. These segments also have thin metallic plates bonded to opposite faces thereof, and are adapted to be retained in position by the channel-shaped extension 22 formed on the axle housing 6. It will thus be seen that longitudinal stresses imparted to the side plates 15 will be absorbed by compression in the segments 20, and that these segments are also arranged to support the vertical loading on the side plates on side frame members.

Intermediate their ends, the side plates 15 carry suitable transversely extending journals 23 adapted to receive pivot shafts 24 carrying depending arms 25. The arms 25 at their lower ends are joined to provide a journal for the transversely extending bolster 26, which bolster at its center is provided with the king pin receiving portion 27. Thus the bolster 26 is mounted for rocking movement about an axis transversely of the truck, and is also arranged for lateral swinging movement due to the pivotal connection of the arms 25 to the hangers or journals 23 to take up body sway in the vehicle. The bolster member 26 is provided with openings through which the shafts 9 are free to extend, such openings being of sufficient clearance so that regardless of the movement of the swinging bolster the shafts are at all times clear thereof.

Disposed outwardly of the side plates 15, there is provided a second parallelly extending plate 30 which, intermediate its ends, is provided with suitable brackets 32 for supporting a magnetic track brake structure, indicated generally at 33, the details of which form no part of the present invention. This track brake structure includes a substantially rectangular frame extending transversely of the truck beneath the side plates 15, which frame at its corners is provided with the pads 34 engageable with suitable stop pads 35 carried by the plate member 30 for transferring the braking reaction of the magnetic track brake to the truck. One end of each of the plates 30 is bolted as at 36 to the end plate 37 of the spring assembly 20. However, the opposite end of each of the plates 30 has an articulated connection, through the rubber sandwiches 38, to an extension 39 of the channel 17 formed in the housing 6. As a result, the plates 30 have articulated movement at one end relative the adjacent axle, and thereby accommodate relative vertical movement between the two axles due to track irregularities.

It will be noted that with this construction, the spring arrangements 16, which take lateral stresses as well as vertical reactions, are disposed diagonally in opposite corners of the truck frame and that the spring assemblies 20, which take in addition to vertical loads longitudinal stresses, are disposed at the opposite diagonal corners of the truck frame. This provides a balanced structure in which, due to the rubber connections between the axle housings 6 and the side frame members 15 which carry the bolster, both lateral, longitudinal and vertical stresses are absorbed by the spring elements 16 and 20, and are not transmitted from one axle to the other. This provides a substantially floating frame on the truck, as well as producing a quieter and smoother riding vehicle as well as one in which there is no metal to metal contact between the side frame members and the truck axles. Also, by the articulation of the plates 30 which carry the magnetic brake structure, stresses imposed thereon are not transferrable from one truck axle to the other.

In Figure 2, I have disclosed a truck construction which is substantially symmetrical along the longitudinal center line A—A, and consequently, only one-half of the structure is shown. This construction includes the wheels 5 which, in this form of the invention, are carried in axle housings 6 of the same general type as shown in Figure 1 except that the housings 6 are provided adjacent the wheels 5 with vertical boss portions 40. Each of the housings 6 is also provided with a gear box portion 7' receiving the driving shaft 9 coming from the motor 10 supported in conventional manner by the cross arms 13, as previously described.

The side plate 42 in this form of the invention is provided intermediate the transverse motor support members 13 with the bracket or re-inforcing angle member 43, and adjacent its ends is provided with re-inforcing ribs or flanges 44 welded to it and also to the transverse plate 45 carried at each end. The transverse plates 45 are adapted to engage the end faces of suitable rubber spring members 46 which are arranged, as shown in detail in Figure 3, between the end wall of a channel member 47 secured to the boss 40 of one of the axle housings 6 and the associated plate 45 of the side frame member 42. The opposite axle housing 6 shown at the right hand side of Figure 2 is provided with an angle member 48 secured to the boss thereof between the base of which and the plate 45 there is provided corresponding resilient spring members 49. These spring members are compressed in position, and are so arranged that they absorb longitudinal reactions between the axle housings and the side frame member through compression, and take the vertical loads imposed upon the side frame members in vertical shear. Such rubber sandwiches are well known in the art, and it is not believed that a detailed description of the sandwiches is necessary.

In order to absorb lateral stresses between the axle housings 6 and the side frame member 42, additional rubber spring elements 50 and 52 are provided. They are compressed between the inner longitudinally extending flange of the channel 47 and the inner face of the plate 42, while the springs 52 are compressed between the longitudinal portion of flange 48 and the inner face of plate 42. Thus, any tendency for relative lateral movement of the plate 42 and the housings 6 is accommodated by these resilient spring elements, which also carry a portion of the vertical load.

Mounted on the outer face of the plate 42 intermediate the transverse cross members 13 there is provided a shock absorber 53 which has its extending arm 54 connected by the link 55 to a second parallelly extending plate 56 which extends longitudinally between the two axle housings. This provides for absorbing shock reactions between the two plates 42 and 56. Adjacent the shock absorber 53 there is provided the brake operating mechanism for the motor shaft brake 12 and this mechanism is indicated generally at 57, including the brake operating rod 58 extending through the plates 42 and 56.

Carried on the outer plate 56 are suitable brackets 60 which support a magnetic brake assembly, indicated generally at 62.

The second plate member 56 at one end is rigidly secured, as by welding, to one flange of the channel member 47, as indicated at 63, whereby it is rigidly connected through the channel member 47 to the associated axle housing 6.

At its opposite end the plate 56 has rigidly secured thereto journal member 64 having reinforcing ribs 65 and having a semi-cylindrical journal portion 67 encircling the axle housing 6 at the right hand side of Figure 2 immediately adjacent the boss 40 thereon. Secured thereto is a corresponding cap member 68, with the members 67 and 68 being provided with projecting ears 69 whereby the members can be clamped together. As shown in Figure 4, the members 67 and 68 are of arcuate section, and the axle housing at this point is provided with the radially extending flange or web 70 having a channel-shaped rim portion 72 whereby an annular ring of rubber 73 may be clamped therebetween. This provides a resilient journalling for the plate 56 about one of the axle housings 6, whereby any variation in vertical movement in the housings due to track irregularities will be accommodated by a rotative movement of the plate 56 relative to one of the housings.

It is to be understood that the corresponding plate on the opposite side of the truck is journalled at the diagonally opposite corner from the plate 56 shown. With such a construction, it is apparent that the spring assemblies 46, 49, 50 and 52 provide a non-metallic resilient connection between the side frame members 42 and the axle housings, and at the same time support the vertical loads therebetween and accommodate lateral and longitudinal stresses therebetween. By the use of plate members such as 42, 56 and 43 and the simplified construction of the resilient non-metallic mounting, it is obvious that a much simpler construction can be provided than was previously attainable.

In Figure 3 it will be noted that the flanges or bosses 40 of the housing 6 are provided at their lower ends with means for closing in the under-surface of the spring assemblies. This is for the purpose of preventing the entrance of foreign material therein, and comprises a transverse plate 80 which is welded in position between the base portions of channel 47 and extends to a position forwardly of the lateral springs 50 where it is closed in by a second transversely extending plate 82. A similar plate 80' is provided for the other spring assembly and is also closed by a plate 82' to form a complete closure for the under surface of the spring assemblies at each end of the truck. The plates 82 and 82' serve another useful purpose in providing a bumping block adapted to be engaged by the angles 83 carried by the magnetic track brake mechanism 62 to limit its oscillating movement and to provide for transmission of the braking effort to the truck frame.

It is therefore believed apparent that I have provided a simplified and novel truck construction which is capable of being manufactured at greatly reduced cost, and is fabricated from materials which are easily attainable and which need little or no machine work.

I am aware that various changes may be made in certain details of the present construction, and I therefore do not intend to be limited except as defined by the scope and spirit of the appended claims.

I claim:

1. In a rail truck, a pair of longitudinally spaced axle housings, side frame members comprising vertically arranged plates extending between said axle housings, resilient non-metallic means comprising vertically arranged rubber sandwiches supporting each side frame member at its ends on the adjacent housing, a plate extending along each side frame member and secured rigidly at one end to one of said axle housings, the opposite end of each plate having an articulated connection to the other axle housing, and a magnetic track brake assembly supported from said plates.

2. The combination of claim 1 wherein the articulated connections of the plates to the axle housings are reversed on opposite sides of the truck.

3. A rail truck comprising spaced transverse axle housings having drive axles journalled therein, vertical plate members extending between corresponding ends of said housings to form a rectangular frame, rubber shear loaded elements connecting the ends of said plates to said housings and including segments disposed at right angles to each other and arranged to absorb both lateral and longitudinal reactions between said plates and housings, and a parallel plate member on the outboard side of each frame plate rigidly secured at one end to the load receiving side of the adjacent shear loaded elements and having an articulated connection at the opposite end to the other housing.

4. In a rail truck, longitudinally spaced axle housings, frame members extending between corresponding ends of said housings, vertically arranged rectangular rubber elements supporting said members on said housings and arranged for vertical shear loading and for compression loading against lateral and longitudinal reactions between said plates and said housings, axles journalled within said housings, and motors rigidly supported between said frame members and including means for driving said axles, said rubber elements comprising rectangular segments arranged transversely of the truck at one end of said plate and longitudinally of the truck at the other end of said plate.

5. In a rail truck, longitudinally spaced axle housings, frame members extending between corresponding ends of said housings, vertically arranged rubber elements supporting said members at said ends on said housings and arranged for vertical shear loading and for compression loading against lateral and longitudinal reactions between said plates and housings, axles journalled within said housings, and motors rigidly supported between said frame members and including means for driving said axles, said rubber elements comprising rectangular segments with certain of said elements at each end of each plate arranged longitudinally of the truck and other segments at each end of each plate arranged transversely of the truck.

6. A rail truck including axle housings having axles journalled therein, each housing having a vertically arranged bracket thereon at each end extending toward the other housing, vertical side plate members extending between said housings and terminating in transverse vertical surfaces at the ends thereof, rubber elements arranged between said surfaces and the bases of said brackets, and additional rubber elements arranged between the longitudinal sides of said plate and parallel vertical sides of said brackets, whereby said elements carry the load of said plates in shear and also cushion both longitudinal and lateral reactions between said plates and said housings.

7. A rail truck including a truck frame comprising side plate members, transverse cross-members therebetween, laterally and longitudinally offset motors supported in the respective cross members and having oppositely extending drive shafts, axle housings at opposite ends of said side plate members having offset gear housing portions receiving the respective drive shafts, axles journalled in said housings and driven from said shafts, a bolster in said frame transversely cradled on said members intermediate said cross-members, and elastic non-metallic vertically arranged rectangular segments having load transmitting connection to and supporting the ends of said side plate members on the housings and parallel sets of vertical surfaces on said housings and said plate members arranged normally to each other and confining said segments laterally therebetween.

8. The truck of claim 7 further characterized in the provision of a magnetic track brake assembly for said truck, and plate means paralleling said side plate members for supporting said assembly said carried by and having articulated connection around the axis of one of said housings.

9. A rail truck according to claim 7 including separate brake means for said shafts, and brake actuating means therefor carried by said plate members.

10. A rail truck including a frame comprising parallel side plate members spaced apart by transverse cross members rigidly connected therebetween, said plates terminating in normally directed vertical flange portions, a car body supporting bolster having swing links cradling it for transverse movement, means journalling said links on said side plate members intermediate said cross members, axles for each end of said frame, axle housings for said axles having vertical bosses adjacent the ends thereof, brackets having support on said bosses and providing both laterally and longitudinally directed vertical surfaces, a first set of rubber elements having one portion thereof secured to the lateral surfaces of said brackets and another portion thereof secured to the flange ends of said side plate members, a second set of rubber elements having one portion thereof secured to said longitudinal bracket surfaces and another portion secured to the adjacent longitudinal plate surfaces to support the load of said frame in vertical shear from said housings.

11. In a rail truck, a frame comprising parallel longitudinally extending side plate members spaced apart by transverse cross-members to form a rigid construction, a pair of transverse axle housings having axles journalled therein and arranged beyond the ends of said side plate members, non-metallic elastic means comprising vertically extending rubber sandwiches interconnecting said ends of said plate members and said housings, and means intermediate said cross members stiffening said plates against lateral stresses.

12. In a rail truck, a frame comprising parallel longitudinally extending side plate members spaced apart by transverse cross-members to form a rigid construction, a pair of transverse axle housings having axles journalled therein and arranged beyond the ends of said side plate members, non-metallic elastic means comprising vertically extending rubber sandwiches interconnecting said ends of said plate members and said housings, means intermediate said cross-members stiffening said plates against lateral stresses, and secondary vertical plates extending longitudinally on the outer side of said plate members between said housings and having pivotal mounting about one of said housings.

13. In a rail truck, a frame comprising parallel longitudinally extending side plate members spaced apart by transverse cross-members to form a rigid construction, a pair of transverse axle housings having axles journalled therein and arranged beyond the ends of said side plate members, resilient rubber sandwiches arranged vertically between and connecting said housings and side plate members, secondary plate members rigidly connected at one end to one housing and having articulated connections at the opposite ends for rotation about the housing center, and a track brake assembly carried by said secondary plate members.

14. The truck of claim 13 further characterized by the provision of shock absorber means between said plate members on each side of said truck.

ALFRED O. WILLIAMS.